H. FURUKAWA.
AUTOMATIC RELEASING MECHANISM FOR CAMERAS.
APPLICATION FILED OCT. 21, 1914.

1,144,301.

Patented June 22, 1915.

WITNESSES:
O. Johnson
A. Haskins

INVENTOR
Hyosaku Furukawa
BY
C. D. Haskins
ATTORNEY

UNITED STATES PATENT OFFICE.

HYOSAKU FURUKAWA, OF SEATTLE, WASHINGTON.

AUTOMATIC RELEASING MECHANISM FOR CAMERAS.

1,144,301. Specification of Letters Patent. Patented June 22, 1915.

Application filed October 21, 1914. Serial No. 867,783.

*To all whom it may concern:*

Be it known that I, HYOSAKU FURUKAWA, a subject of the Emperor of Japan, residing at Seattle, in the county of King and State of Washington, have invented a certain new and useful Improvement in Automatic Releasing Mechanism for Cameras, of which the following is a specification.

My invention relates to improvements in mechanism for releasing automatically the shutter of a photographic camera, and the object of my invention is to provide a simple and reliable mechanical device which may readily be attached to and be detached from a photographic camera and which, when it is attached to a camera, shall be adjustable to operate automatically to actuate the shutter releasing mechanism of such camera only upon the expiration of a predetermined period of time.

I accomplish this object by devices illustrated in the accompanying drawings wherein—

Figure 1:
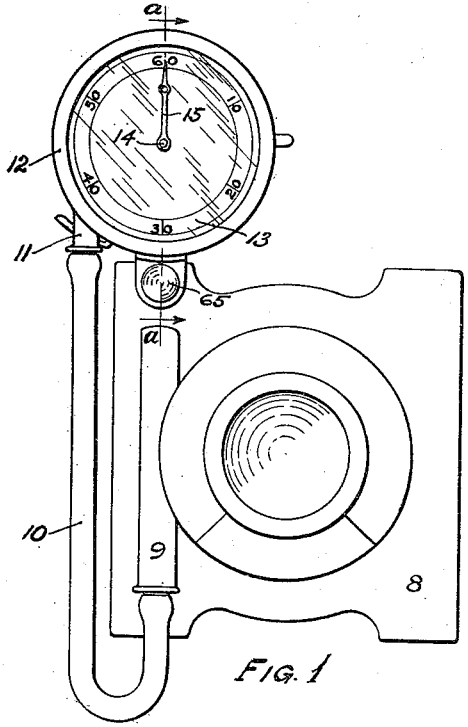
Figure 2:
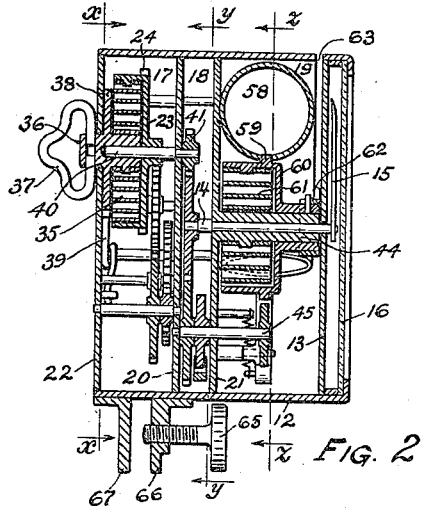
Figure 4:
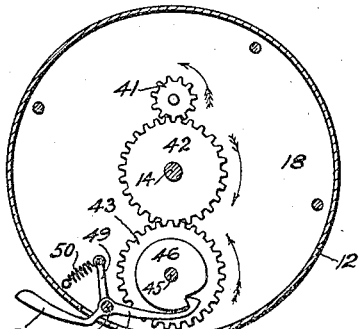
Figure 3:
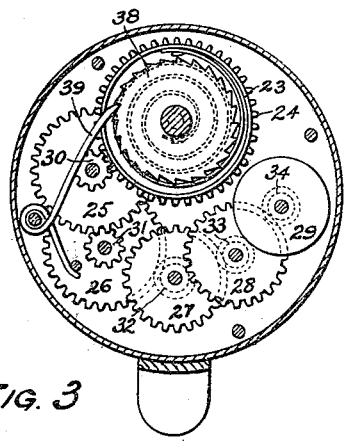
Figure 5:
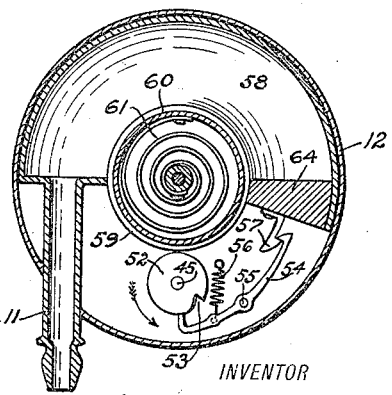
Figure 6:
Figure 6:
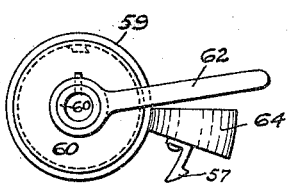

Figure 1 illustrates, by a view in front elevation, a structure embodying my invention as attached to a frame plate associated with the object glass of a camera; Fig. 2 is a view of the same in vertical mid-section on broken line $a$, $a$ of Fig. 1; Fig. 3 is a view of the same in vertical section on broken line $x$, $x$ of Fig. 2; Fig. 4 is a view of the same in vertical section on broken line $y$, $y$ of Fig. 2; Fig. 5 is a view of the same in vertical section on broken line $z$, $z$, of Fig. 2; and Fig. 6 illustrates parts of my invention by a view in side elevation.

Referring to Fig. 1 of the drawings, throughout which drawings like reference numerals indicate like parts, 8 indicates a frame plate which is associated with the pneumatically operated shutter mechanism and the object lens of a camera, the air cylinder 9 of which pneumatic shutter mechanism only is shown, and 10 is a flexible air conducting tube which extends from the lower end of the cylinder 9 to a nipple 11 which projects from a cylindrical case 12, through which tube 10 air may be conducted from said nipple 11 into the cylinder 9.

The case 12, within which are disposed the principal parts of my invention, is provided with a dial 13 in its front portion and a glass which is indicated by numerous oblique lines in Fig. 1 but which is indicated by the numeral 16 in Fig. 2. Projecting outwardly through the center of the dial 13 is the end portion of a rotatable shaft 14 upon which end portion is fixed a pointer 15 that may indicate the rate of a rotary movement of the shaft 14. The interior of the case 12 is divided into three compartments 17, 18 and 19 by partitions 20 and 21. Within the compartment 17 is disposed a spring-actuated train of wheels, as more clearly shown in Fig. 3, whose pivots find bearings in the rear wall 22 and the partition 20, which train of wheels comprises a spring-box 23, which is provided with teeth 24, and gearwheels 25, 26, 27 and 28, together with a fly-wheel 29, and pinions 30, 31, 32, 33 and 34 all of which are arranged to operate in a well known manner.

As shown more clearly in Fig. 2 the spring-box 23 contains a coiled clock-spring 35 the outer end of which is attached to the spring-box 23, while its inner end is attached to a winding arbor 36 that is adapted to be rotated by a key 37 and secured to such winding arbor 36 is a ratchet wheel 38 whose teeth may be engaged by a spring-pawl 39 whereby the winding arbor 36 may rotate only in the direction required to wind the clock-spring 35. The spring-box 23 is securely mounted on a shaft 40, one of whose end portions is rotatably disposed within a bearing formed by a concentrically disposed hole formed in the inner end portion of the winding arbor 36, while its other end portion projects into the compartment 18 through a bearing in the partition 20 and within such compartment 18 a pinion 41 is fixed on such projecting end portion of said shaft 40 whereby such pinion 41 shall revolve in response to the revolution of the spring-box 23. Engaging with such pinion 41 is a gearwheel 42 which is mounted on the shaft 14 which is disposed concentrically with the cylindrical casing 12 to be rotated in bearings formed by a hole that is drilled through the partition 21 into and through a concentrically disposed stud 44 which is integral with the partition 21 and which projects toward the dial 13, the front end portion of which shaft 14 carries the pointer 15. Within the compartment 18 is also a gearwheel 43 which meshes with the gearwheel 42 and such gearwheel 43 is mounted on a shaft 45 which finds its bearings in pivot holes formed in the partitions 20 and 21 and mounted securely on such shaft 45 within the compartment 18 is a notched disk 46 the notch of which is adapted to engage with a pawl 47 which is pivoted to the partition 18 by a pivot 48 such pawl 47 being provided with one arm 49 to which is attached a spring 50 by the force of which the pawl 47 is caused to enter the notch of the notched disk 46 to prevent the rotation of the spring-box 23 and the train of wheels associated therewith. The pawl 47 is also provided with an arm 51 which extends outwardly through a hole in the cylindrical wall of the casing 12 which arm 51 may be actuated by one's finger to withdraw the pawl 47 from the notch in the disk 46 to permit the rotation of the gear-wheel 43 (in the direction indicated by the arrow in Fig. 4) in response to the action of the clock-spring 35 in the spring-box 23.

The front end portion of the shaft 45 extends through the partition 21 into the compartment 19 and upon such front end portion is fixed a cam-wheel 52 which is provided with a notch 53 which cam-wheel 52 is adapted to actuate a locking lever 54 which is pivotally mounted on a stud 55 extending from the partition 21, said locking lever 54 being provided with a retractile spring 56 which constantly acts to force one end of such locking lever 54 against the periphery of the cam-wheel 52 whereby when such cam-wheel 52 is rotated in the direction indicated by the arrow in Fig. 5, then when the notch 53 registers with the adjacent end of the locking lever 54 such adjacent end will drop into the notch 53 in response to the force of the retractile spring 56, thus to cause the opposite end of the locking lever 54 to swing from its locking contact with a catch 57. Disposed within the upper half of the compartment 19 is an air chamber 58 of circular cross-section formed of a curved tube extending throughout a semicircle, to one end of which air chamber is connected the nipple 11 that communicates with the flexible tube 10 shown in Fig. 1. The wall of the chamber 58 is provided with a slot that extends throughout its length in that portion of it that is nearest the central portion of the casing 12, and within such slot is a movably disposed ridge 59 which projects from the periphery of a spring-box 60 which is rotatably mounted on the stud 44 that projects from the partition 21 and within such spring-box 60 is disposed a coiled clock-spring 61 whose ends are connected respectively with the spring-box 60 and the stud 44. The spring 61 is adapted to be wound up by means of an arm 62 which is fixed to the hub of the spring-box 60 which arm 62 is disposed to project radially through a slot 63 formed in the circular wall of the casing 12, as indicated in Fig. 2, and securely attached on the spring-box 60 is a radially projecting segment of a ring of circular cross-section which is adapted to slidably fit within the wall of the air chamber 58 to serve as a piston 64 which thus disposed is adapted to move throughout the length of the air chamber 58 in response to one half of a revolution of the spring-box 60. The fixed relative positions of the arm 62 and the piston 64 is such that when the piston 64 is in the position shown in Fig. 5 then the spring 61 will be wound up and the catch 57, which is fastened to the piston 64, will normally engage with the hooked end of the locking lever 54, the other end of which locking lever 54 will engage with the cam-wheel 52 to maintain the locking lever 54 and catch 57 in engagement except when the cam-wheel 52 turns to such position that its notch 53 registers with the adjacent end of the locking lever 54, in which case such end of the locking lever 54 will enter the notch 53 to disengage its other end from the catch 57 in response to the force of the helical spring 56 and upon such disengagement the force of the clock-spring 61 will cause the piston 64 to swing throughout the length of the air chamber 58 to force the air contained therein through the nipple 11, thence through the flexible tube 10, thence into the cylinder 9 to actuate the pneumatically operated shutter of the camera of which the cylinder 9 is a part. The case 12 is secured to the plate 8 of the camera by a clamping device comprising a clamping screw 65 and two lugs 66 and 67 which operate in an obvious manner.

The operation of the structure thus illustrated and described is simple. If, for instance, one desires to photograph himself he clamps the casing 12 to the plate 8 of his camera then winds up the clock spring 35 by turning the key 37 while the notched disk 46 is maintained stationary by pawl 47, then the flexible tube 10 is connected between the nipple 11 and the cylinder 9, as shown in Fig. 1; then the arm 62 is turned to move the piston 64 into such position as will engage the catch 57 with the locking lever 54; then he moves the arm 51 to release the pawl 47 from the notched disk 46 to permit the train of wheels to revolve and while such wheels are revolving he places himself in a desired attitude before the camera and the train of wheels continuing to revolve slowly rotates the cam-lever 45 in the direction of the arrow, shown in Fig. 5, until the adjacent end of the locking lever 54 drops into the notch 53 whereupon the catch 57 will be released to permit the force of the clock-spring 61 to move the piston 64 to the other end of the air chamber 58 forcing the air contained through the flexible tube 10 into the cylinder 9 to actuate the pneumatic mechanism that is adapted to release the shutter of the camera in a well known manner. The time that elapses between the release of the pawl 47 and the catch 57 will depend upon the rate of rotation of the fly wheel 29 and such rate of rotation will depend upon the weight or form of such wheel; for instance, such fly wheel 29 may be provided with radial wings whose planes are radially disposed in parallel with the axis of such fly wheel 29 whereby such wings may meet with the resistance of air or such fly wheel may be very heavy whereby its weight will cause increased friction of its pivots.

Obviously numerous changes may be made in the form and arrangement of the parts of my invention without departing from the spirit thereof.

What I claim is:

1. A device of the class described comprising a casing, a pair of spaced vertical partitions in said casing dividing the same into three compartments, a clock mechanism in one compartment, a train of gearing in the middle compartment, air compressing mechanism in the other compartment, the train of gearing in the middle compartment being operatively connected to the air compressing mechanism and the clock mechanism, and independent mechanism for operating the air compressor when said clock mechanism releases the same.

2. A device of the class described comprising a casing, an open ended semi-cylindrical tube arranged in said casing, a piston in said tube, means for operating said piston, a clock mechanism within said casing, and means associated with said clock mechanism and piston operating means for holding said piston at one end of said tube, said clock mechanism adapted to operate said last named means to release said piston operating means whereby the piston may move to the opposite end of the tube.

3. A device of the class described comprising a casing, an arcuate cylinder within said casing, a spring actuated piston within said arcuate cylinder, a clock mechanism within said casing, means associated with said casing and piston for holding the piston at one end of the cylinder against the tension of the spring, and means operatively associated with said clock mechanism and said piston retaining means adapted to be moved to free the piston and allow the spring to move the piston through the cylinder.

4. A device of the class described comprising a casing, an arcuate cylinder within said casing, a spring actuated piston within said arcuate cylinder, a clock mechanism within said casing, means associated with said casing and piston for holding the piston at one end of the cylinder against the tension of the spring, means operatively associated with said clock mechanism and said piston retaining means adapted to be moved to free the piston and allow the spring to move the piston through the cylinder, means for holding the clock mechanism inoperative, and means operated exteriorly of the casing for retracting the piston to its initial operative position.

It witness whereof, I hereunto subscribe my name this tenth day of October A. D., 1914.

HYOSAKU FURUKAWA.

Witnesses:
O. JOHNSON,
A. HASKINS.

Copies of this patent may be obtained for five cents each, by addressing the "Commissioner of Patents. Washington, D. C."